United States Patent [19]

Klauke et al.

[11] 3,897,495

[45] July 29, 1975

[54] PERHALOGEN-2-AZAPROPENES PROCESS

[75] Inventors: Erich Klauke, Odenthal-Hahnenberg; Hans Holtschmidt, Leverkusen-Steinbuechel; Kurt Findeisen, Leverkusen, all of Germany

[73] Assignee: Bayer Aktiengesellschaft, Leverkusen, Germany

[22] Filed: Jan. 6, 1972

[21] Appl. No.: 215,907

[30] Foreign Application Priority Data

Jan. 12, 1971 Germany.............................. 2101107

[52] U.S. Cl.............................. 260/566 D; 252/305
[51] Int. Cl............................................ C07c 119/00
[58] Field of Search................................ 260/566 D

[56] References Cited
UNITED STATES PATENTS

| | | | |
|---|---|---|---|
| 2,912,429 | 11/1959 | Tullock...................... | 260/566 D X |
| 3,190,918 | 6/1965 | Holtschmidt.................... | 260/566 D |
| 3,287,425 | 11/1966 | Maynard...................... | 260/653.8 X |
| 3,574,775 | 4/1971 | Fuller........................... | 260/653.8 X |

OTHER PUBLICATIONS

Simon, "Fluorine Chemistry," Vol. I, Academic Press, pg. 402 (1950).
Young et al., J. Am. Chem. Soc., Vol. 80, pp. 3604–3606 (1958).
Hudlicky, Chemistry of Organic Fluorine Compounds, pp. 87–115, (1962).

*Primary Examiner*—Bernard Helfin
*Assistant Examiner*—Gerald A. Schwartz
*Attorney, Agent, or Firm*—Burgess, Dinklage & Sprung

[57] ABSTRACT

Perhalogen-2-azapropenes such as perfluoro-2-azapropene and the novel compounds monofluorodichlormethyl isocyanide dichloride and difluoromonochloromethyl isocyanide dichloride are prepared by reacting trichloromethyl isocyanide dichloride with sodium fluoride in an organic solvent at a temperature of from 80° to 220°C. At least 5 moles of sodium fluoride are used to produce the perfluoro compound and no more than 5 moles are used to produce the novel isocyanide dichloride compounds.

5 Claims, No Drawings

PERHALOGEN-2-AZAPROPENES PROCESS

BACKGROUND

This invention relates to the novel compounds, monofluorodichloromethyl and difluoromonochloromethyl isocyanide dichloride, and to a chemically unique process for their production and for the production of the known compound, perfluoroazapropene.

Perfluoroazapropene can be obtained on a preparative scale by any one of the following three processes:

1. Pyrolysing the bis-trifluoromethyl carbamic acid fluoride obtained by the electrochemical fluorination of dimethyl carbamic acid chloride in hydrogen fluoride (J. American Chem. Soc. 78, 5637 (1956)):

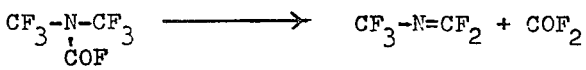

2. Pyrolysing perfluorine (2-methyl-1,2-oxazolidine) [J. Chem. Soc. London, 1955, page 1881]:

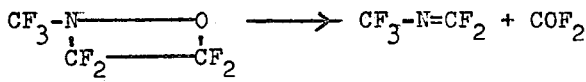

3. Dehydrofluorinating bis-trifluoromethyl amine with potassium fluoride (J.Gen.Chem. USSR (English translation) 29,2662 (1960)):

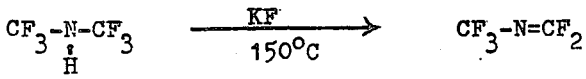

The first two processes involve technically elaborate methods for the production of the starting compounds, and high pyrolysis temperatures in the final stage.

The starting compound for the third process, namely bis-trifluoromethyl amine, is produced from trichloromethyl isocyanide dichloride and hydrogen fluoride. The subsequent dehydrofluorination stage involves repeated passage of the amine through a tube coated with potassium fluoride. This dehydrofluorination reaction is by no means easy to control and, for this reason, it was proposed (J.Chem. Eng. Data 10 399 (1965)), to convert the dimeric perfluoro azapropene readily formed during dehydrofluorination (J. Chem. Eng. Data 10, 399 (1965)) into the monomer by pyrolysis:

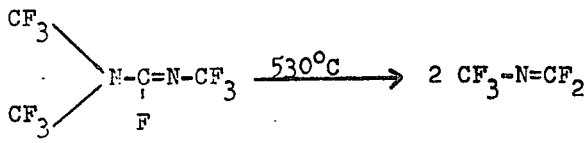

SUMMARY

It has now been found that perhalogen-2-azapropenes can be obtained particularly easily in high yields by reacting trichloromethyl isocyanide dichloride with at least the stoichiometrically necessary quantity of sodium fluoride in an organic solvent.

DESCRIPTION

The reaction is carried out at a temperature in the range of from 80° to 220°C. and preferably at a temperature of from 100° to 160°C.

The fact that the process according to the invention can be carried out must be regarded as particularly surprising because, according to J.Gen.Chem. USSR (English translation) 29, page 2662 (1960), all attempts to obtain a chlorine/fluorine exchange such as this with different metal fluorides have failed.

The trichloromethyl isocyanide dichloride required for carrying out the process according to the invention is known and can be obtained very easily on a large scale by chlorinating dimethyl carbamic acid chloride.

The new process is preferably used in the production of perfluoro-2-aza propene, although it can of course also be used for producing the two new compounds, monofluorodichloromethyl and difluoromonochloromethyl isocyanide dichloride. The process is illustrated by way of example with reference to the preferred production of perfluoro-2-azapropene:

Reaction of the trichloromethyl isocyanide dichloride with sodium fluoride is preferably carried out in an aprotic, organic solvent. In addition to ethyl phenyl sulphone, di-n-butylsulphone, 1-nitrobutane and nitrobenzene, sulpholan represents a preferred aprotic organic solvent. Sodium fluoride is used in at least the stoichiometrically necessary quantity per mol of the trichloromethyl isocyanide dichloride. At least 5 mols of sodium fluoride per mol of trichloromethyl isocyanide dichloride, but preferably 7.5 to 12.5 mols of sodium fluoride, are used for the production of perfluoro-2-azapropene. If, however, importance is attached to the production of monofluorodichloromethyl and difluoromonochloromethyl isocyanide dichloride, the quantity in which the sodium fluoride is used is best reduced so that only 2 to at most 5 mols of sodium fluoride are used per mol of the trichloromethyl isocyanide dichloride.

The process according to the invention can readily be carried out by mixing the components in a receiver at room temperature, followed by heating to an elevated temperature. A distinct reaction begins at 100°C, and the perfluoro azapropene is removed by distillation through a small column. Most of the perfluoro azapropene distills off between 100° and 130°C. To terminate the reaction, the reaction mixture is briefly heated to from 180° to 200°C. However, the sodium fluoride is best introduced in the solvent, heated to 120°–140°C and the trichloromethyl isocyanide dichloride added dropwise, the low-boiling reaction product being simultaneously removed at a head temperature of the column of from −30° to +15°C. Details of the process are given in the Example.

Perfluoro azapropene is an important intermediate product for numerous reactions (R.G.Banks "Fluorocarbons and their derivatives" page 92, Oldbourne Press, London, 1964; U.S. Patent Specification No. 2,966,517). The new compounds can also be similarly used. They are of course also suitable for the production of plant protection agents and can also be directly used as such. The novel compounds can also be used as pressure gases for aerosol containers.

EXAMPLE 1

2100 g (50 mols) of dried sodium fluoride are introduced into 1.6 litres of sulpholan in a glass flask equipped with a stirring mechanism, a dropping funnel, a thermometer and surmounted by a column with a reflux condenser, and heated to 150°C. A solution of 1080 g (5 mols) of trichloromethyl isocyanide dichloride in 800 ml of sulpholan is then introduced dropwise over a period of 3 hours at a temperature between 150° and 160°C. The fluorination product is continuously removed at the head of the column at a transition temperature of from −20° to +12°C. A total of 645 g of distillate is obtained. 520 g (78 of the theoretical) of perfluoro azapropene boiling at −33° to −31°C/760 Torr are obtained therefrom by redistillation. 100 g of dimeric perfluoro azapropene, namely N,N,N'-tris-(trifluoromethyl)-fluoro formamidine, boiling at 38°–39°C, and 20 g of unchanged starting compound are also obtained.

EXAMPLE 2

84 g of sodium fluoride are added to 431 g of trichloromethyl isocyanide dichloride in 400 ml of sulpholan in an apparatus of the kind described in Example 1.

The mixture is quickly heated to 80°C without removing any distillate from the head of the column, and thereafter to 160°C. at a rate of 20°C per hour. After cooling to 80°C, followed by the addition of another 84 g of sodium fluoride, the mixture is heated for 3 hours to 170°C, stirred for one hour at 170°C and then worked up by distillation.

The yields obtained, based on the trichloromethyl isocyanide dichloride reacted, are as follows: 40.5% of the theoretical yield of perfluoro azapropene, 50% of the theoretical yield of $FCl_2C-N=CCl_2$ of b.p. 130°C, $n_D^{20}$ : 1.4730, a signal at −63.5 ppm in the $^{19}F$-NMR ($CF_3COOH$ standard), 8.5% of the theoretical yield of $F_2ClC-N=CCl_2$, b.p. 89°C, $n_D^{20}$: 1.4072, a signal at −41.8 ppm. in the $^{19}F$-NMR ($CF_3COOH$ standard).

What is claimed is:

1. Process for preparing perflouro-2-azapropene which comprises reacting trichloromethyl isocyanide dichloride with at least the stoichiometrically necessary quantity of sodium fluoride in an organic solvent at a temperature of from 80° to 220°C.

2. Process of claim 1 wherein the reaction is carried out at a temperature of from 100° to 160°C.

3. Process of claim 1 wherein the reaction is carried out in an aprotic organic solvent.

4. Process of claim 3 wherein the solvent is tetramethylene sulphone.

5. Process for preparing perfluoro-2-azapropene which comprising reacting trichloromethyl isocyanide dichloride with from 7.5 to 12.5 mols of sodium fluoride in an organic solvent at a temperature of from 80°–220°C.

* * * * *